Aug. 23, 1927.
J. BARRY
1,639,976
FISH CUTTING MACHINE
Filed March 22, 1927
2 Sheets-Sheet 1
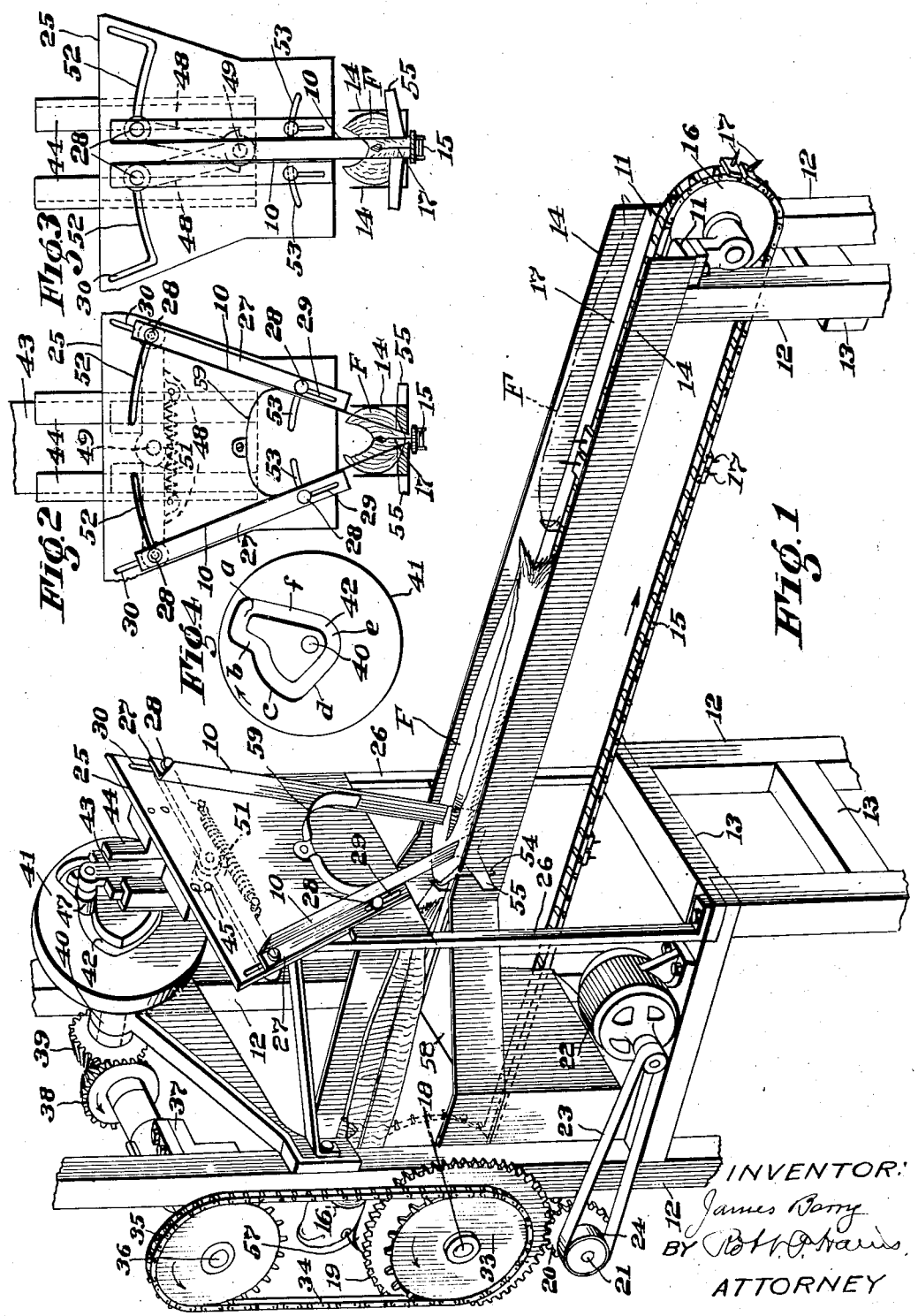
INVENTOR:
James Barry
BY
ATTORNEY Aug. 23, 1927.
J. BARRY
1,639,976
FISH CUTTING MACHINE
Filed March 22, 1927
2 Sheets-Sheet 2
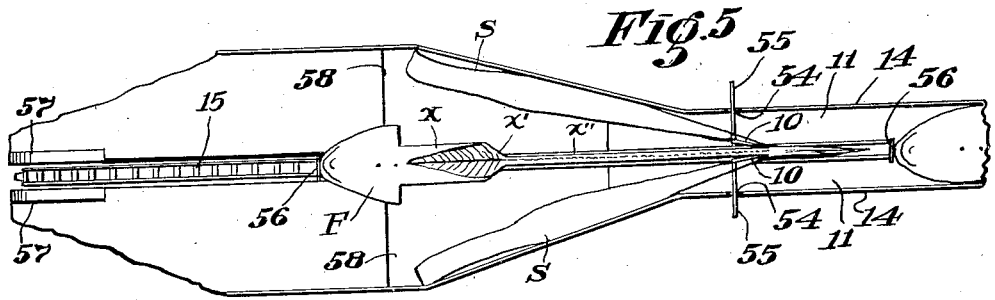
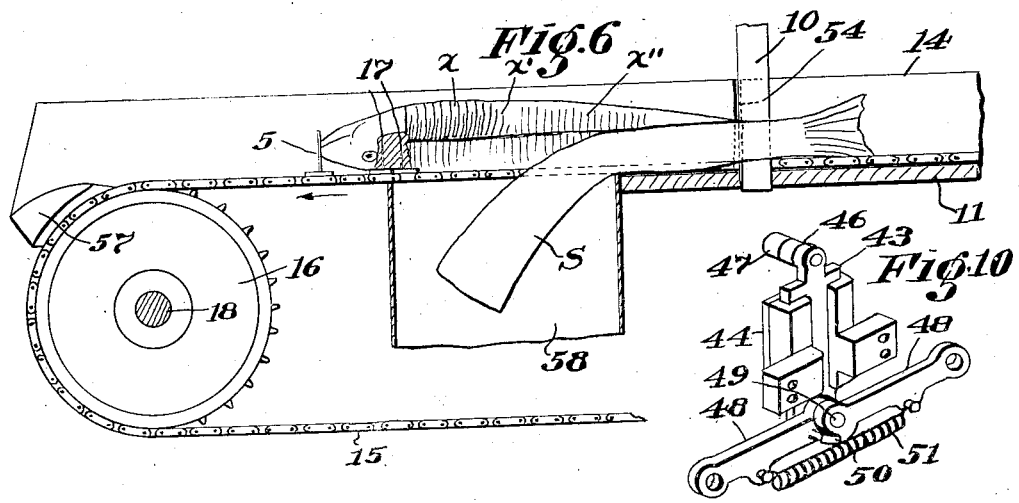
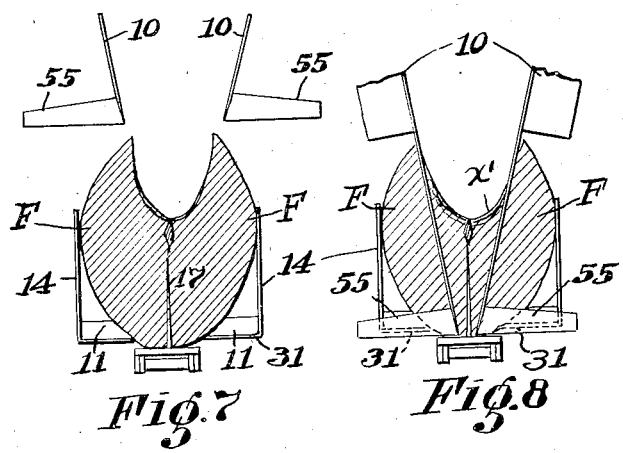
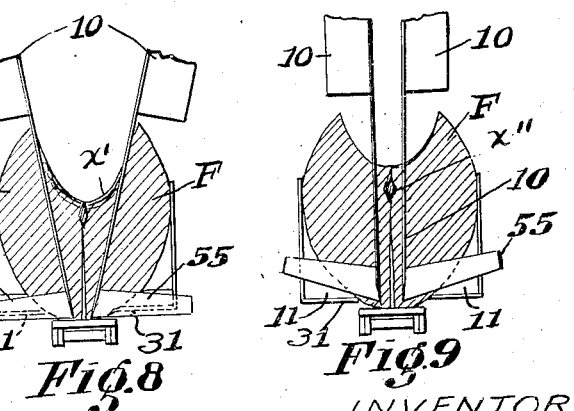
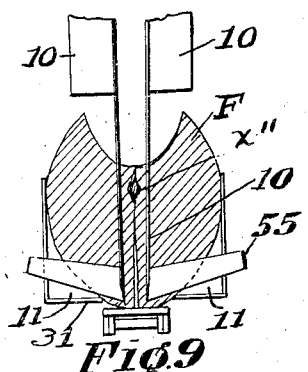
INVENTOR:
James Barry
BY Robt. P. Harris,
ATTORNEY Patented Aug. 23, 1927.

1,639,976

UNITED STATES PATENT OFFICE.

JAMES BARRY, OF MEDFORD, MASSACHUSETTS.

FISH-CUTTING MACHINE.

Application filed March 22, 1927. Serial No. 177,272.

This invention relates to a machine for cutting the meat from each side of the fish's backbone.

It has been proposed heretofore to cut a slab or slice of meat from the opposite sides of a fish by removing the fish's head and then advancing the body of the fish between a pair of spaced rotating cutters so that a slab or slice of meat is cut from each side of the fish while the backbone passes between the spaced cutters.

This proposed type of machine makes no provision for the variations in the bony structure of the fish from the head to the tail, and, as a result, if the knives are placed sufficiently close to each other to cut close to the backbone near the tail of the fish, they will cut too close to the backbone near the head of the fish, and if the knives are spaced sufficiently to clear the bony structure near the head of the fish, they will fail to cut sufficiently close to the tail portion of the backbone to prevent a substantial waste of fish meat.

The present invention, therefore, relates to a novel form of fish cutting machine in which the knives are shifted in timed relation with the fish advancing means to conform to variations in the bony structure of the fish.

One important feature of the invention resides in means for presenting the knives to the fish and for shifting them during their cutting operation in conformity with the tapered shape of the fish's backbone.

Another feature of the invention resides in means for positively advancing the fish to the cutting position and for shifting the cutters in timed relation with the movement of the fish.

Other features of the invention and novel combination of parts in addition to the above will be hereinafter described in connection with the accompanying drawings which illustrate one good practical form of the invention.

In the drawings:

Fig. 1 is a perspective view of a fish cutting machine constructed in accordance with the present invention, the knives being shown in their lowered position;

Fig. 2 is a vertical sectional view through the fish supporting trough of Fig. 1, looking toward the knives;

Fig. 3 is a similar view but shows the knives shifted toward each other;

Fig. 4 is a front view of a cam wheel to be described;

Fig. 5 is a top plan view of a portion of the trough of Fig. 1, and shows the carcass of a fish and the meat that has been cut therefrom;

Fig. 6 is a side elevation of the parts shown in Fig. 5;

Fig. 7 is a sectional view through a fish and supporting trough, the knives being shown in their elevated position;

Fig. 8 is a similar view, the knives being shown in their lowered position;

Fig. 9 is a view similar to Fig. 8, the knives being shown closer together; and

Fig. 10 is a perspective view of operating parts to be described.

The mechanism for carrying out the present invention may be given various embodiments, and in the particular embodiment of the invention illustrated, the fish F is advanced within a trough toward the cutters 10. The trough consists of the longitudinally extending floor boards 11 which are spaced apart to provide a slot between them.

The fish guiding trough may be supported at a convenient height from the floor by uprights 12 that are connected by transversely extending braces 13. At the opposite sides of the fish supporting trough are provided the side walls 14, and the width of the trough is preferably such that the side walls 14 will engage the opposite sides of the fish, as shown, so that when the fish is lying upon its back it will be prevented from turning over on its side. The fish which are fed to a particular cutting machine should be graded, so that only fish of a predetermined size will be fed to a machine designed to receive that size of fish. If desired, a number of machines such as that shown in the drawings may be employed and each machine may have a feed trough designed to receive a particular size of fish.

The means shown for advancing the fish towards the cutters 10 consists of an endless chain 15 which passes around the sprockets 16 supported beneath the trough near its opposite ends. The sprocket chain 15 is shown as provided at spaced intervals along its length with pins 17 adapted to be forced into the head of the fish when the latter is lying upon its back, as best shown in Fig. 6, the construction being such that travel of the sprocket chain in the direction indicated by the arrows, will serve to advance the fish along the feed trough towards the cutters 10. One of the chain supporting sprockets may be mounted upon the transversely extending shaft 18, as shown, and this shaft may be driven by a gear 19 which meshes with a pinion 20 mounted upon a second shaft 21. This second shaft may be driven from an electric motor 22 mounted upon the supporting frame of the machine, and the motor is provided with a driving belt 23 that passes around a pulley 24 secured to the shaft 21. While the pins 17 secured to the sprocket chain constitute a simple and satisfactory means for positively feeding the fish towards the knives 10, it will be apparent that various other means may be employed for engaging the head of the fish in such a manner that it will be advanced by the sprocket chain 15.

The knives 10, in the embodiment of the invention illustrated, are mounted upon a supporting plate 25, and this plate may be held in a vertical position above the feed trough by securing the sides of the plate 25 to the uprights 26, as shown. The knives 10 are given an L-shaped construction in cross-section, as shown, the arrangement being such that an angularly disposed portion 27 of each knife rests against the plate 25 and is secured thereto for sliding movement by the transversely extending pins or rivets 28. The knives 10 are normally supported at an inclination to each other, as best shown in Fig. 2, and they are adapted to be forced into cutting engagement with the fish F while supported at an inclination to each other, as will be apparent from Fig. 2.

In order that the knives 10 may partake of the sliding movement just mentioned, each knife is provided near its lower end with a longitudinally extending slot 29 adapted to receive a loose rivet or pin 28. The supporting plate 25 is provided near its upper end with the elongated slots 30 adapted to receive the knife supporting pins or rivets 28 provided at the upper end of the knives 10. The construction of the knife supporting means is such that when the knives 10 are held in their uppermost position, the lower ends of these knives will clear the advancing fish, as will be apparent from Fig. 7, and when the knives 10 are moved downwardly to the position in which they are shown in Figs. 1, 2 and 8, they will cut through the neck of the fish just back of its head, as will be apparent from Fig. 1, and the lower ends of the knives 10 when in this position will enter guide slots formed in the plates 31 which may be secured to the under face of the trough forming boards 11. After the knives 10 have been lowered to the position in which they are shown in Fig. 1, their further movement in a downward direction may be arrested by engagement of the upper pins 28 with the lower portion of the elongated slots 30.

The object of supporting the knives 10 at an inclination to each other, as shown in Fig. 1, is to cause these knives to clear the bony structure of the fish, which bony structure is shown in Figs. 5 and 6. It will be understood that in most fish the backbone is considerably thicker near the head of the fish than it is near the fish's tail, and in several species of fish, such, for example, as haddock and cod, the backbone has, near the head of the fish, laterally extending ribs, such as shown in Figs. 5 and 6. These ribs may extend lengthwise of the fish for approximately one-third its length, as shown, and it is important that the knives 10 be so constructed and operated that they will cut the meat from the fish as close to the bony structure just mentioned as may be practical, while at the same time the knives will not cut this bony structure. By moving the knives 10 downwardly through the neck of the fish while the knives are supported at an inclination to each other, the knives will cut practically all the meat from each side of the fish's backbone, while at the same time they will clear the backbone and the laterally extending ribs, as will be apparent from Fig. 8.

In accordance with the present invention, the knives 10 after they have been forced downwardly through the neck of the fish at an inclination to each other, as best shown in Fig. 8, are caused to remain in this position for a short period of time until the meat at opposte sides of the fish has been cut from the wide bony structure $x$, whereupon the inclined knives are moved inwardly towards each other to the position in which they are shown in Figs. 3 and 9. This movement of the knives 10 takes place while the tapered or inclined portion $x'$ of the bony structure is passing between the knives, so that by the time the relatively narrow portion $x''$ of the fish's backbone is being advanced between the knives, these knives will lie in the approximately vertical position in which they are shown in Fig. 9, and from which figure it will be apparent that the meat of the fish is being cut from each side of the fish close to the backbone $x''$. The knives 10 remain in the position in which they are shown in Fig. 9 until the remaining portion of the fish has passed between them, with the result that two slabs or slices of meat S will be entirely removed from the carcass of the fish. The knives 10 are then quickly elevated to the position in which they are shown in Fig. 7, so that their lower ends will clear the head of the next advancing fish.

It will be apparent that the operation of the knives just described should be accurately timed to conform with the travel of the fish lengthwise of the feed trough, and this is accomplished in accordance with the present invention by providing the chain driving shaft 18 wth a sprocket 33 adapted to receive the chain 34 which serves to drive the sprocket 35 secured to a transversely extending shaft 36. The shaft 36 is journaled in bearing brackets 37 supported by the uprights 12, and this shaft is provided with a beveled gear 38 which meshes with a similar gear 39, the latter being secured to a cam shaft 40 rotatively mounted in a supporting bracket. The cam shaft 40 is provided with the cam wheel 41, in the front face of which is formed the cam groove 42 having the configuration best shown in Fig. 4. The cam groove 42 serves to impart a vertical sliding movement to a block 43 which is suitably mounted in the supporting head 44 which head is rigidly secured by rivets or bolts 45 to the knife supporting frame 25. The block 43 is provided at its upper end with a laterally extending pin or stub shaft 46 and the outer end of this stub shaft is provided with a roller 47 which lies in and is operated by the cam slot 42. The arrangement is such that rotation of the cam wheel by the driving means described will impart a vertical sliding movement to the block 43 which movement in turn is imparted to the knives 10.

The operation of the knives 10 is preferably such that they are held in their uppermost position for a short time while the head of a fish is being advanced beneath the lower ends of these knives, whereupon they are quickly lowered to the position in which they are shown in Fig. 1 in order to force the knives through the flesh of the fish just back of the head. This desired operation of the knives is secured by providing the cam groove 42 with the dwell portion a which serves to hold the knives momentarily in their uppermost position. The knives are then moved downwardly rapidly by the portion b of this cam acting upon the roller 47, whereupon the knives are held in this lowered position by the dwell portion c of the cam for a period of time sufficient to cause the bony structure 42 of the fish to pass between the knives.

The movement of the block just mentioned is transmitted to the knives by the togglelinks 48, the opposite ends of which are preferably secured to the knives by the upper pivot pins or rivets 28, and the inner ends of these links are connected by the pin or stub shaft 49 which is secured to the lower portion of the sliding block 43. The togglelinks are constructed so that they may break downwardly, as shown in Fig. 3, but are prevented from breaking upwardly from the horizontal position in which they are shown in Fig. 10 by the cooperating stops 50. The toggle-links 48 are normally held in their extended position, as shown in Fig. 10, by a strong spring 51. As a result of the toggle construction just described, the knives will be raised and lowered by the extended toggle links, but when the knives have been moved downwardly to their lowermost position, as shown in Fig. 2, further movement of the operating block 43 in a downward direction will break the toggle, as shown in Fig. 3, and this will serve to pull the upper ends of the knives 10 toward each other, as will be apparent from Fig. 3. In order to permit this movement of the knives, the supporting plate 25 is provided with the arcuate slots 52 and 53 adapted to receive the supporting rivets or pins 28.

The knives 10, as above stated, should be allowed to remain in the position in which they are shown in Fig. 3 for a substantial length of time, while the relatively long portion $x''$ of the fish's backbone is passing between these knives; this is accomplished by providing the cam slot 42 with the steeply inclined portion $d$ and with the dwell portion $e$ which lies close to the cam operating shaft 40. As soon as the knives have completed their cutting operation, they are quickly raised to the elevated position of Fig. 7 by the steeply inclined portion $f$ of the cam.

It is important that the knives 10 be so constructed that they will completely sever slabs of meat S from the head portion of the fish; each knife 10 is therefore provided with a cutting blade 54 which serves to cut the meat from the backbone of the fish as the latter is advanced between the knives, and each cutter is also provided with a laterally extending wing or auxiliary blade 55 which serves to sever the slab of meat from adjacent the fish's head as each knife is forced downwardly through the fish's neck. The outer end portion of each auxiliary knife 55 may enter the slot 54 formed in a side wall 14 of the guiding trough. It will be apparent from the foregoing that since the feeding chain 15 and knives 10 are operated in timed relation with each other, each fish F should be fastened to the chain 15 accurately in a predetermined position. The feed chain is therefore provided with the stops 56 against which the nose of the fish may be placed in order to accurately position the head of the fish as it is engaged with the prongs or pins 17.

The carcass of the fish from which the slabs of meat S have been removed may be automatically disengaged from the feeding chain 15 by providing the fixed blocks 57 positioned adjacent the end of the upper run of the feed chain 15, the arrangement being such that as this chain passes downwardly around the sprocket 16, the head of the fish will be wedged by the blocks 57 out of engagement with the pins 17, whereupon, the carcass of the fish will automatically fall into a receptacle placed to receive the same. The slabs of fish meat S may be directed directed laterally out of the feed trough into suitable receptacles by the transversely inclined deflector plates 58.

It will be apparent from the foregoing that all the machine attendant is required to do is to attach the fish to the conveyor chain by engaging the head of each fish with the pins 17, whereupon, each fish will be advanced between the knives and the slabs or strips of meat S will be cut from the fish in the manner above described. The fish should be opened and cleaned, as shown, before they are fed to the machine. The bowed spring 59 may be provided to hold the lower ends of the knives in spaced relation to each other.

What is claimed is:

1. A fish cutting machine, comprising in combination, means for advancing a fish toward the cutting position, knives mounted for reciprocatory movement toward and from their cutting position, means operable in timed relation with the fish advancing means for moving the knives into position to cut a slab of meat from each side of the fish, and additional means for advancing the knives towards each other during the cutting operation.

2. A fish cutting machine, comprising in combination, means for advancing a fish toward the cutting position, knives provided with cutting side and end walls, means for moving the knives in the direction of their length to cause the ends of the knives to pierce the fish, and means for holding the knives so that their cutting side walls will cut the flesh from the opposite sides of the fish.

3. A fish cutting machine, comprising in combination, means for advancing a fish, knives mounted for movement toward and from their cutting position to cut a slab of meat from each side of the fish, and means for moving the knives in timed relation with the fish advancing means in conformity with variations in the shape of the fish's backbone.

4. A fish cutting machine, comprising in combination, spaced knives positioned to engage the opposite sides of a fish, means for positively advancing the fish relatively to the knives to cut a slab of meat from each side of the fish, and means for automatically shifting the knives in conformity with the bony structure of the fish.

5. A fish cutting machine, comprising in combination, spaced knives adapted to engage the opposite sides of a fish, means for advancing the fish relatively to the knives, and means for feeding the knives toward each other during their cutting operation to cause them to cut closer to the fish's backbone.

6. A fish cutting machine, comprising in combination, spaced knives adapted to engage the opposite sides of a fish, means for feeding the fish relatively to the knives, and means for moving the knives through an angle to each other during their cutting operation.

7. A fish cutting machine, comprising in combination, a fish support, means for engaging the head of a fish to advance the fish along said support toward the cutting position, and knives supported to cut a slab of meat from each side of the fish as the latter is advanced between the knives.

8. A fish cutting machine, comprising in combination, means for engaging the head of the fish to advance the fish toward the cutting position, knives supported to cut a slab of meat from each side of the fish as the latter is advanced between the knives, and means operable in timed relation with said advancing means to shift the knives so that they will clear the fish's head.

9. A fish cutting machine, comprising in combination, means for engaging a fish and advancing it toward the cutting position, knives for cutting a slab of meat from each side of the fish, and means operable in timed relation with said advancing means to thrust the knives into the neck of the fish so that they will clear the fish's head.

10. A fish cutting machine, comprising in combination, means for engaging the fish and advancing it toward the cutting position, knives for cutting a slab of meat from each side of the fish, and means operable in timed relation with the advancing means to move the knives relatively to each other to accommodate variations in the thickness of the fish's backbone as the latter is advanced between the knives.

11. A fish cutting machine, comprising in combination, means for advancing a fish toward the cutting position, knives supported above the fish advancing means, and means provided with cutting ends operable in timed relation with the advancing means for moving the ends of the knives downwardly into cutting engagement with the fish.

12. A fish cutting machine, comprising in combination, means for positively advancing a fish toward the cutting position, a knife for cutting the meat from one side of the fish, and means operable in timed relation with the fish advancing means and adapted to shift the knife in conformity with variations in the fish's backbone.

13. A fish cutting machine, comprising in combination, a fish supporting trough having upstanding side walls arranged to engage the opposite sides of a fish to hold the fish on its back, power actuated means for advancing the fish stomach up along said trough, and a cutter supported adjacent the trough in position to cut a slab of meat from the fish as the fish is advanced relatively to the cutter and trough by said advancing means.

14. A fish cutting machine, comprising in combination, a fish supporting trough having a slot extending lengthwise of the trough and upstanding side walls arranged to engage the opposite sides of a fish to hold the fish upon its back, means mounted in said slot and adapted to engage the fish and advance it along the trough toward the cutting position, and a cutter supported adjacent the trough in position to cut a slab of meat from the fish as the fish is advanced toward the cutter.

15. A fish cutting machine, comprising in combination, a pair of knives normally supported at an inclination to each other, means for feeding a fish toward said knives, means for moving the inclined knives into engagement with a fish to cut the meat from the opposite sides of the backbone and including means for changing the relative inclination of the knives during the cutting operation.

16. A fish cutting machine, comprising in combination, a pair of knives normally supported at an inclination to each other, means for feeding a fish toward said knives, means for moving the inclined knives into engagement with a fish to cut the meat from the opposite sides of the backbone and including means for shifting the knives into substantially parallel relation to each other during the cutting operation.

17. A fish cutting machine, comprising in combination, fish supporting means, a cutter supported for movement in the direction of its length into engagement with the fish and provided with a laterally extending auxiliary blade, means for forcing the cutter into the fish so that one blade forms a cut transversely of the fish and the other forms a cut longitudinally of the fish, and means for advancing the fish relatively to the cutter to complete the cutting operation longitudinally of the fish.

18. A fish cutting machine, comprising in combination, a fish supporting trough, power actuated means for advancing a fish along the trough, cutters supported adjacent the trough to cut the meat from the opposite sides of the fish's backbone, and inclined deflector plates for directing the meat cut from the fish laterally out of the trough.

19. A fish cutting machine, comprising in combination, a knife, means for advancing the fish toward the knife, means for shifting the knife in timed relation with the travel of the fish to vary its cutting operation, and a stop associated with said advancing means and adapted to accurately position the fish relatively to the advancing means.

20. A fish cutting machine, comprising in combination, a pair of knives, means for advancing the fish toward the knives to cut meat from the opposite sides of the fish, and cam means for shifting the knives during their cutting operation in conformity with the contour of the fish's bony structure.

21. A fish cutting machine, comprising in combination, a pair of knives, means for advancing the fish relatively to the knives to cut meat from the opposite sides of the fish, and a toggle connection for shifting the knives during their cutting operation.

In testimony whereof, I have signed my name to this specification.

JAMES BARRY.